April 5, 1927.

A. F. SCHWANKE 1,623,363

CREAM SEPARATOR BOWL WASHER

Filed June 25, 1926

INVENTOR.
Albert F. Schwanke,
BY David E. Carlsen
ATTORNEY.

Patented Apr. 5, 1927.

1,623,363

UNITED STATES PATENT OFFICE.

ALBERT F. SCHWANKE, OF GREY EAGLE, MINNESOTA.

CREAM-SEPARATOR-BOWL WASHER.

Application filed June 25, 1926. Serial No. 118,453.

My invention relates to a device for washing the bowls of cream separators and the object is to provide a simple, highly efficient and inexpensive device for said purpose.

Figure 1:
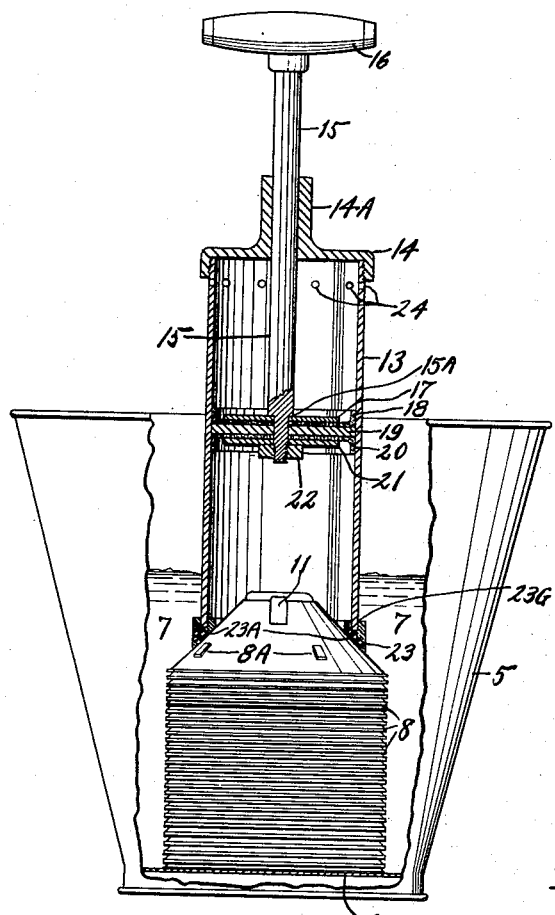
Fig. 1 is a vertical sectional elevation of my device applied to a cream separator bowl placed on the bottom of a pail containing a washing fluid, the pail being shown partly in section.
Figure 2:
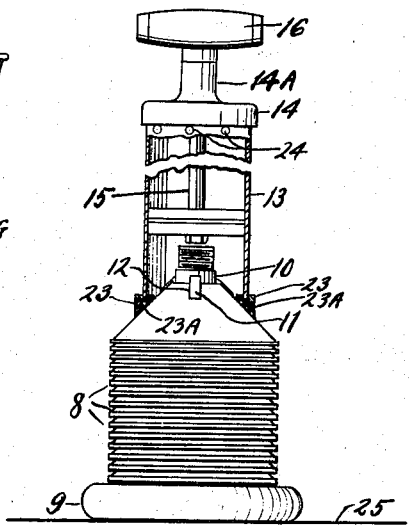
Fig. 2 is a vertical sectional view of my device as applied to a cream separator bowl of a certain construction.

Referring to the drawing by reference numerals, 5 designates a pail or other suitable receptacle having a bottom 6 and containing any suitable cleansing liquid 7. 8 is a complete set of the inverted funnel shaped discs used in a cream separator comprising a so-called bowl, said discs spaced apart by suitable lugs $8^A$ on the discs. There are various means in different makes of cream separator bowls for holding the discs in proper alignment such as a bowl bottom 9 with a central upright tubular element 10 with external keys or splines 11 engaging in radially arranged apertures 12 about the central opening of the discs (see Fig. 2). The tube 10 has opening means (not shown) registering with the spaces between the discs.

My improved device comprises a cylindrical normally upright body member 13 open at its lower end and having a removable cap 14 preferably threaded on the upper end and having an upward central extension $14^A$ bored longitudinally for a piston rod 15 having a suitable handle 16 at its upper end and a piston secured on its end within the cylinder. Near the lower end of rod 15 it is reduced to form a shoulder $15^A$ and the end of the reduced portion is threaded.

The piston comprises an upper metal washer 17 engaging shoulder $15^A$, a leather washer 18 with upwardly directed perimetral flange $18^A$ engaging the inner wall of the cylinder, a central spacing washer 19, a lower leather washer 20 with downwardly directed perimetral flange and a lower metal washer 21, all said washers clamped together upwardly against shoulder $15^A$ by a nut 22 engaging the threaded lower end of the rod 15.

23 is a ring of rubber, fiber or other suitable soft material with an inwardly and downwardly directed circular face $23^A$ adapted to frictionally engage, concentrically, the upper face of the top disc 8, said ring having an upwardly opening circular groove $23^G$ occupied frictionally by the lower end of the cylinder 13.

24 is a circular row of apertures in cylinder 13 at or near cap 14 to permit free passage of air to and from the upper chamber of the device when the piston rod is reciprocated.

In the use of the device the operator grasps the extension $14^A$ of cap 14 with one hand, holds the cylinder vertically and concentric above the discs and presses ring 23 upon the top disc and with the other hand he grasps the handle 16 and reciprocates the piston rod and piston. Upward strokes cause a partial vacuum drawing the cleaning fluid 7 forcibly up through and between the discs into the lower chamber of the cylinder and downward strokes pushes the fluid forcibly down between and outwardly from the discs, thus cleaning them all rapidly and efficiently in a short time. Drying of the discs may also take place very rapidly by the same operation with the bowl removed from its submerged position to a table top or other available flat surface 25 (see Fig. 2).

What I claim is:

1. A washing device for cream separator discs consisting of a series of vertically spaced inverted funnel shaped discs, said device comprising a cylindrical body, a cap member on the upper end of said cylinder, a ring member of soft material securable to the lower edge of said cylinder and adapted to be pressed downwardly concentrically upon the top of the discs, a piston reciprocable in said cylinder, a piston rod extending upwardly through said cap member, and a hand hold on the upper end of said piston rod.

2. The structure specified in claim 1 in which said cylinder cap is formed with a hand hold comprising an upwardly directed concentric extension of the cap.

In testimony whereof I affix my signature.

ALBERT F. SCHWANKE.